Feb. 7, 1961 E. W. NOLIN 2,970,400
FISHING APPARATUS
Filed Aug. 5, 1958
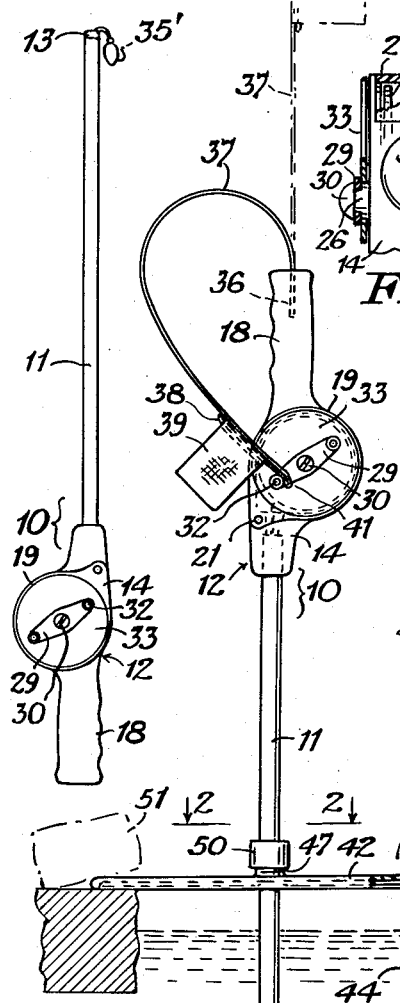
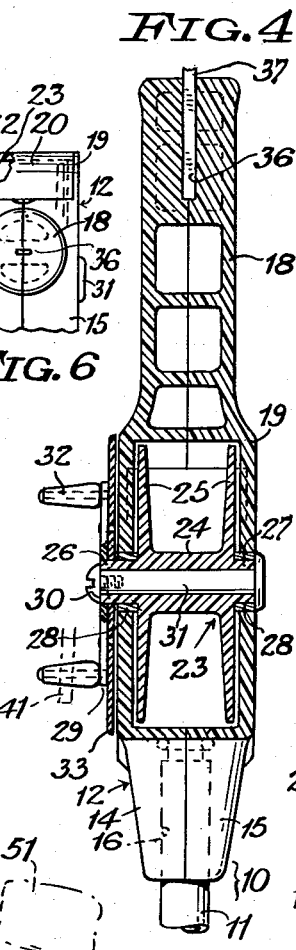
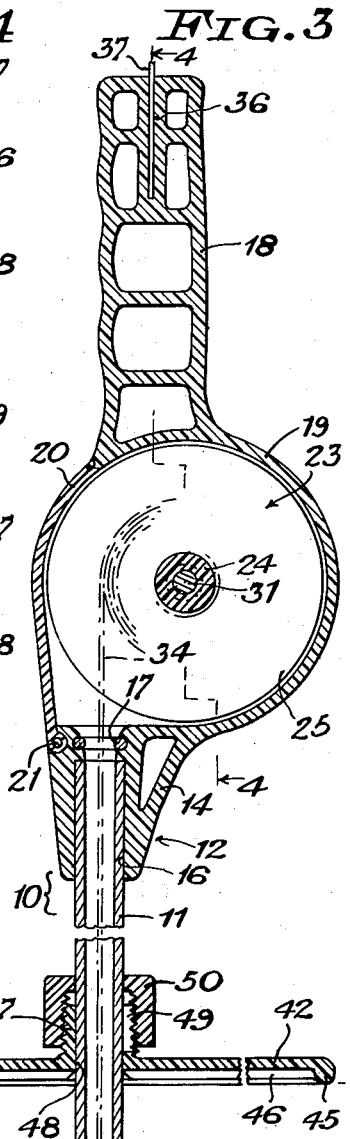
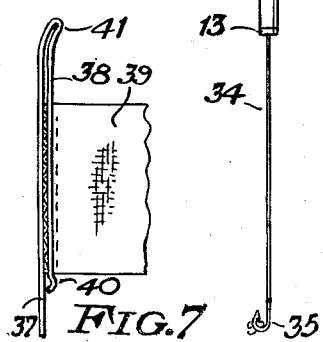
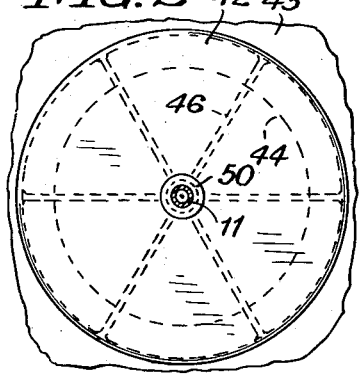
INVENTOR
EARL W. NOLIN
By Christopher L. Waal
ATTORNEY 2,970,400
Patented Feb. 7, 1961

2,970,400
FISHING APPARATUS
Earl W. Nolin, R.R. 2, W. 179, S. 6729, Muskego, Wis.
Filed Aug. 5, 1958, Ser. No. 753,271
7 Claims. (Cl. 43—17)

This invention relates to fishing rigs or apparatus.

An object of the invention is to provide an improved fishing apparatus including a fishing rod which can be used interchangeably for ice fishing and casting, and which when used for ice fishing can readily be supported over an ice hole.

Another object is to provide a fishing apparatus which when used for ice fishing will avoid freezing of the fishing line.

Still another object is to provide a fishing apparatus including a simple but effective signal device which can readily be detached when the fishing rod of the apparatus is used for casting.

A further object is to provide a fishing apparatus which is capable of inexpensive manufacture and can be constructed largely of plastic material.

The invention further consists in the several features hereinafter described and claimed.

In the accompanying drawing,

Fig. 1 is an elevational view of a fishing apparatus of the invention in use for ice fishing, a signal device thereof being shown in latched position by full lines and in released position by dotted lines;

Fig. 2 is a sectional plan view taken generally on the line 2—2 of Fig. 1, showing a rod-supporting plate or disk of the apparatus;

Fig. 3 is a fragmentary vertical sectional view of the apparatus on an enlarged scale;

Fig. 4 is a sectional view taken generally on the line 4—4 of Fig. 3;

Fig. 5 is a fragmentary top view of the central hubbed portion of the rod-supporting plate;

Fig. 6 is a fragmentary outer end view of a reel-carrying fishing rod handle of the apparatus, parts being broken away and parts being shown in section;

Fig. 7 is a fragmentary detail view of the flag-carrying end portion of a signal device of the apparatus, parts being shown in section, and Fig. 8 is an elevational view of the fishing rod in readiness for use as a casting rod.

In the drawing, 10 designates generally a reel-carrying fishing rod, hereinafter more fully described, which can be used as a part of an ice fishing rig, as indicated in Fig. 1, or as a casting rod, as indicated in Fig. 8.

The fishing rod 10 comprises a slightly tapered, resilient tubular stem or shaft 11, such as of resin-bonded glass fiber, having its larger-diameter end rigidly secured to a handle 12, and having its free end provided with a ferrule or eyelet 13 forming a line guide. The handle 12 is formed of complementary halves or sections 14 and 15 of molded plastic material firmly cemented together, the junction plane extending in the axis of the tubular shaft 11. The anchored end of the tubular shaft 11 is cemented in a stepped bore or socket 16 formed in the handle, and an anti-friction guide ring 17 of metal or plastic is cemented in the inner end portion of the bore 16 to form a line guide. If the handle is molded of nylon or other low-friction plastic the guide ring 17 may be omitted. The end of the handle remote from the shaft socket forms a hollow hand grip 18 which is interiorly ribbed. Between the hand grip and the tubular shaft, the handle is enlarged to form a generally cylindrical reel housing 19 which is closed at a peripheral portion by an arcuate cover plate 20 pivotally secured to the handle by a transverse pivot pin 21, the cover plate fitting in marginally rabbeted portions 22 of the opposite parallel side walls of the housing and being frictionally and releasably held in closed position. The reel housing 19 receives coaxially therein a rotatable reel or spool 23 of molded plastic material having a cylindrical hub 24 and disk-like end flanges 25. The reel hub has end extensions 26 and 27 which are journalled in bearings bushings 28 embedded in the spaced parallel side walls of the reel housing. A double-ended crank handle 29 is secured to the hub extension 26 of the reel by a screw 30 which is threaded into the end of a headed retaining pin 31 extending through the reel hub portion 24, the crank handle being provided at its opposite end portions with rotatable finger grips 32. The reel may be provided with suitable braking means, such as a manually controlled external brake disk 33. The axis of the reel extends transversely of the axis of the tubular rod shaft 11 and is offset therefrom, so that the axis of the tubular shaft will intersect the middle of the radial winding depth of the reel, as indicated in Fig. 3. A fishing ling 34 is wound on the reel and extends outwardly through the hollow shaft 11, the outer end of the line carrying a baited fish hook 35, Fig. 1, or a casting hook 35', Fig. 8.

A socket 36 is formed longitudinally in the outer end of the hand grip 18 along the junction plane of the complementary handle sections and is adapted to receive the end portion of a resilient signal wire 37 when the device is used for ice fishing, as indicated in Fig. 1, the wire being frictionally and detachably held in place. The wire is preferably flat, as shown, but a round wire may be used instead. The free end of the resilient wire is reversely bent, as best seen in Fig. 7, to form a leg portion 38 for attaching a signal flag 39, the flag being pinched between the leg portion and the main body of the wire and preferably having a hemmed or looped edge portion to receive the leg portion 38. The leg portion has an end hump or detent 40 to retain the flag. The folded end 41 of the signal wire is slightly hooked or bent to engage one of the finger grips 32 of the reel crank handle 29, thus forming a latch for releasably holding the reel against rotation. The wire is displaceable to its upright signalling position, shown in dotted lines in Fig. 1, when the reel is turned by a fish pulling on the hooked end of the line.

When used for ice fishing, the fishing rod is supported in a vertical position, handle end uppermost, by a circular supporting plate or disk 42 which is adjustably clamped to the downwardly projecting hollow shaft 11 of the rod and rests on the ice 43 around a hole 44 cut in the ice. The disk is preferably formed of molded plastic and has a downwardly projecting marginal bead 45 adapted to rest on the ice. The disk is further provided with radial stiffening ribs 46 at its underside. At the center of the disk is an upstanding tubular boss 47 having an opening or bore 48 through which the fishing rod shaft 11 passes and in which the shaft is frictionally retained in vertically adjusted position. The boss is radially split at 49, Figs. 3 and 5, and has threaded thereon a cap nut 50 which contracts the boss onto the rod shaft. If desired, the supporting plate 42 may be weighted down, as by blocks of ice 51, or by snow.

When the apparatus is to be set up for ice fishing, the tubular shaft 11 of the fishing rod is inserted through the tubular boss 47 of the supporting plate 42 to project a selected distance therefrom, and the nut member 50 is then tightened to clamp the rod shaft in position. The supporting plate is then set centrally over the ice hole 44, as seen in Fig. 1, and if desired it may be weighted down. The reel 23 is rotated to drop the hook-carrying end of the fishing line 34 is suitable distance below the water level, and the resilient signal wire 37 is flexed downwardly to engage its hooked end 41 against one of the finger grips 32 on the reel handle.

When a fish takes the line hook, the line will be pulled downwardly, thus rotating the reel counterclockwise, as viewed in Fig. 1, and releasing the signal wire from the reel handle, whereupon the signal wire snaps upwardly to the upright signalling position shown by dotted lines in Fig. 1. The fish may then be reeled in and pulled through the ice hole by bodily lifting the rod and attached supporting plate.

The hole-covering supporting plate 42 prevents or minimizes freezing of the water in the ice hole, and the enclosed reel housing avoids freezing of the line.

When fishing is discontinued, the supporting plate and signal device can readily be detached from the fishing rod, thus permitting compact storage of the parts. The rod is then in the condition seen in Fig. 8 and can be used as a casting rod. The fishing rod may thus be used throughout the various fishing seasons.

The signal wire 37, when detached from the rod handle, and with the flag removed, can be used as an inserter or threader for passing the fishing line through the tubular shaft 11, either from the reel housing or from the outer end of the shaft, the line being engaged in the folded end of the wire.

I claim:

1. Fishing apparatus, comprising a fishing rod having a handle with a tubular shaft attached thereto at one end thereof and with a reel carried by said handle and provided with driving means including a crank handle, said tubular shaft adapted to pass a fishing line therethrough, said rod handle having a socket extending longitudinally in its outer end, a supporting member for said fishing rod adapted to rest over and cover an ice hole to minimize freezing of the water in said hole and detachably clamped to said fishing rod at a region below said reel for disposing said shaft in a position to extend downwardly into the ice hole, and a resilient signal wire having one end portion detachably inserted and retained in said socket and the other end portion being deflectable for engagement with said crank handle to releasably hold the reel against rotation and to permit release of said wire to a signalling position upon rotation of the reel by a pull on the line.

2. Fishing apparatus, comprising a supporting plate adapted to extend over and cover an ice hole to minimize freezing of the water in said hole and having a vertical opening therethrough at the middle portion of said plate, and a fishing rod carried by said plate and having a reel and a handle and a tubular line-guiding shaft secured to said handle, said fishing rod extending downwardly from said handle through said plate opening and having a detachable clamped engagement with said plate below said reel, and said shaft adapted to extend downwardly into the ice hole from said plate.

3. Fishing apparatus, comprising a fishing rod having a handle with a tubular shaft attached thereto at an end thereof and with a reel carried thereby and provided with driving means including a crank handle, said shaft adapted to pass a fishing line therethrough, means for supporting said fishing rod over an ice hole with said tubular shaft projecting downwardly into the hole, a resilient signal wire having one end portion detachably secured to said rod handle and the other end portion doubled on itself, and a signal flag carried by said doubled end portion of the wire, said flag having a looped edge portion receiving said doubled end portion of said wire and confined thereon by the adjacent main body portion of said wire, said flag-carrying end portion of the wire being deflectable for engagement with said crank handle to releasably hold the reel against rotation and to permit release of said wire to a signalling position upon rotation of the reel by a pull on the line.

4. Fishing apparatus, comprising a supporting plate adapted to rest over and cover an ice hole to minimize freezing of water in said hole and having a vertical tubular hub portion at the middle portion of said plate, and a fishing rod having a reel-carrying handle and a tubular line-guiding shaft secured to said handle, said plate hub portion being contractible and said tubular shaft extending downwardly through said plate hub portion, and a clamping nut member screw threaded on said hub portion for detachably securing said shaft to said hub portion in longitudinally adjusted vertical position to vary the projection of the lower end of said shaft into the ice hole, and said shaft being adapted to pass a fishing line therethrough into the ice hole.

5. Fishing apparatus, comprising a supporting plate adapted to extend over and cover an ice hole to minimize freezing of water in said hole and having a marginal bottom flange adapted to rest on the ice around the hole, said plate having a vertical opening therethrough at its middle portion, and a fishing rod having a reel-carrying handle and a tubular line-guiding shaft secured to said handle, said shaft extending downwardly through said plate opening from said handle and having a detachable clamped engagement with said plate for supporting said fishing rod in vertically adjusted position with respect to said plate, and said shaft adapted to extend downwardly into the ice hole.

6. Fishing apparatus, comprising a fishing rod having a handle with a tubular shaft secured at one end thereof and with a reel carried thereby and provided with driving means including a crank handle, said shaft adapted to pass a fishing line therethrough and normally projecting downwardly from said reel, a support detachably clamped to said fishing rod below said reel for holding said shaft in downwardly projecting position over an ice hole, and a resilient signal wire having an end portion detachably secured to the other end of said handle, said wire being deflectable for releasable latching engagement with said crank handle, said fishing rod forming a casting rod when said support and signal wire are detached therefrom.

7. Fishing apparatus, comprising a fishing rod having a handle with a tubular line-guiding shaft rigidly attached to an end portion thereof and with a reel carried by said handle and adapted to receive a line, means for supporting said rod in downwardly projecting position over an ice hole, said handle having an open-ended socket extending longitudinally in the end portion of said handle remote from said shaft, and signalling means including a deflectable resilient signal wire having an end portion detachably inserted and retained in said rod handle socket, the other end portion of said wire having a latching connection with said reel to permit release of said wire to signalling position upon rotation of the reel by a pull on the line.

References Cited in the file of this patent

UNITED STATES PATENTS

| | | |
|---|---|---|
| 1,719,695 | Ferguson | July 2, 1929 |
| 1,735,026 | Welch | Nov. 12, 1929 |
| 1,805,095 | Horne | May 12, 1931 |
| 1,870,782 | Minutilli | Aug. 9, 1932 |
| 2,045,063 | Baranowski | June 23, 1936 |
| 2,089,097 | Millett | Aug. 3, 1937 |
| 2,402,882 | Garr | June 25, 1940 |
| 2,448,752 | Wagner | Sept. 7, 1948 |
| 2,735,208 | Bartletti | Feb. 21, 1956 |
| 2,775,053 | Knoll et al. | Dec. 25, 1956 |
| 2,786,294 | Whitacre | Mar. 26, 1957 |

FOREIGN PATENTS

| | | |
|---|---|---|
| 484,805 | Canada | July 15, 1952 |